United States Patent Office 3,813,406
Patented May 28, 1974

3,813,406
PROCESS FOR PREPARING 1-ALKYL-
1,8-NAPHTHYRIDINE COMPOUNDS
Yasuo Wada, Ikeda, and Nanao Watanabe, Sakai, Japan, assignors to Koei Chemical Co., Ltd., Osaka-shi, Osaka-fu, Japan
No Drawing. Filed Feb. 18, 1971, Ser. No. 97,411
Claims priority, application Japan, Feb. 20, 1970, 45/15,015, 45/15,016
Int. Cl. C07d 39/10
U.S. Cl. 260—295.5 B                          15 Claims

ABSTRACT OF THE DISCLOSURE

A process for preparing 1-alkyl-1,8-naphthyridine compounds which comprises treating a compound of the formula:

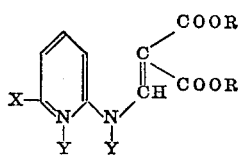

wherein X is an alkyl group having 1 to 3 carbon atoms, Y is an alkyl group having 1 to 10 carbon atoms and R is a lower alkyl group with polyphosphoric acid at a temperature from 160 to 250° C. to give a compound of the formula:

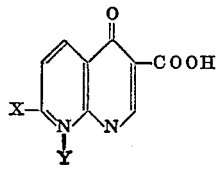

wherein X and Y are each as defined above.

---

The present invention relates to a process for preparing 1-alkyl-1,8-naphthyridine compounds of the formula:

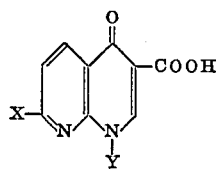

wherein X is an alkyl group having 1 to 3 carbon atoms (e.g. methyl, ethyl, propyl) and Y is an alkyl group having 1 to 10 carbon atoms (e.g. methyl, ethyl, propyl, butyl, pentyl, hexyl, decyl).

The above 1-alkyl - 1,8 - naphthyridine compounds (I) are known and useful as anti-microbial agents against gram-negative bacteria [cf. Japanese Patent Publication No. 21,137/1965; Journal of Medicinal Chemistry, 5, 1063 (1962)].

According to the description in the said literatures, the 1-alkyl-1,8-naphthyridine compounds [I] are produced only through numerous and tedious steps and such process is industrially disadvantageous. That is, as shown in the following scheme, they are customarily prepared by condensing a 6-alkyl-2-aminopyridine with diethyl ethoxymethylenemalonate, cyclizing the resulting diethyl N-(6-alkyl - 2 - pyridyl)-aminomethylenemalonate in refluxing Dowtherm A or diethyl phthalate and hydrolyzing the resultant ethyl 7-alkyl-4-hydroxy-1,8-naphthyridine - 3 - carboxylate to the corresponding free acid, followed by alkylation with alkyl iodide:

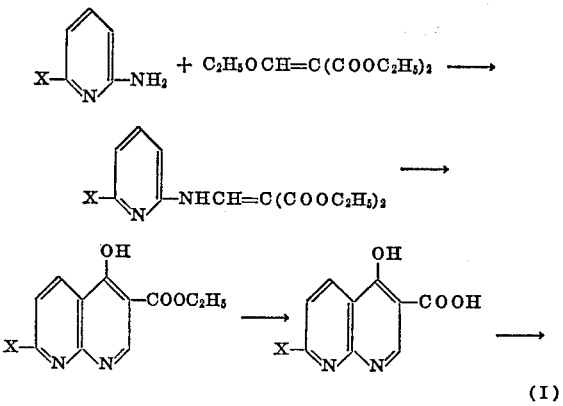

wherein X and Y are each as defined above.

As the result of the study for producing the 1-alkyl-1,8-naphthyridine compounds (I) more advantageously, it has been found that those can be obtained by treating the corresponding dialkyl N-alkyl-N-(2-pyridyl)aminomethylenemalonates of the formula:

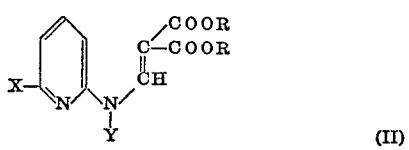

(II)

wherein R is a lower alkyl group (e.g. methyl, ethyl, propyl) and X and Y are each as defined above with polyphosphoric acid.

This finding is of unexpected and surprising nature, because various other acidic substances such as hydrochloric acid, sulfuric acid, phosphoric acid, ferric chloride and stannic chloride can not initiate such cyclization or, even if can, afford the objective 1-alkylated 1,8-naphthyridine compounds (I) only in extremely low yields. Thus, only polyphosphoric acid is presently and practically utilizable for the cyclization.

In accordance with the present invention which is based on the above finding, the 1-alkyl-1,8-naphthyridine compound (I) is produced by heating the corresponding malonic ester compound (II) in the presence of polyphosphoric acid.

The polyphosphoric acid may have any degree of condensation, and the one being 4 in the average degree of condensation is favorably employed. The proportion of the polyphosphoric acid and the malonic ester compound (II) may be 0.5–2:1, preferably 0.8–1:1, by weight.

The heating is effected normally at 160 to 250° C. for 5 to 20 minutes, favorably at 190 to 230° C. for 10 to 15 minutes. When the temperature is lower than the said lower limit, the decomposition of the starting malonic ester compound (II) proceeds predominantly to the cyclization of the same. When the temperature is higher than the said upper limit, the once produced 1-alkyl-8-naphthyridine compound (I) is decomposed to decrease the yield.

The starting malonic ester compound (II) in the above process is novel and can be produced advantageously by reacting a 2-alkylaminopyridine compound of the formula:

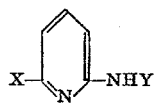

wherein X and Y are each as defined above with an alkoxymethylenemalonic ester of the formula:

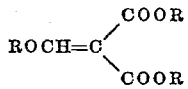

wherein R is as defined above usually at a temperature from 80 to 150° C. (favorably from 100 to 110° C.) for 5 to 12 hours. The use of the alkoxymethylenemalonic ester in excess will assure the better yield of the malonic ester compound (II).

The process of this invention thus affords the 1-alkyl-1,8-naphthyridine compounds in excellent yields and high purities and is highly advantageous from the industrial viewpoint.

Practical and presently preferred embodiments of the present invention are illustratively shown in the following examples.

EXAMPLE 1

A mixture of diethyl N-methyl-N-(6-methyl-2-pyridyl)-aminomethylenemalonate (102 g.) and polyphosphoric acid (88 g.) is heated at 200 to 230° C. for 10 minutes. After cooling, the reaction mixture is made alkaline with 20% aqueous sodium hydroxide solution and shaken with ether. The aqueous layer is made acidic with acetic acid whereby crystals are precipitated. The crystals are separated by filtration and recrystallized from acetonitrile to give 1,7-dimethyl-4-oxo-1,8-naphthyridine-3-carboxylic acid (42 g.) as crystals having a melting point higher than 300° C. From the ether layer, there is recovered 6-methyl-2-methylaminopyridine (12 g.).

The starting compound of this example, i.e. diethyl N-methyl-N-(6-methtyl-2 - pyridyl)aminomethylenemalonate, is produced by heating a mixture of 6-methyl-2-methylaminopyridine (85 g.) and diethyl ethoxymethylenemalonate (151 g.) at 100 to 110° C. for 8 hours while distilling out the by-produced alcohol and subjecting the reaction mixture to distillation under reduced pressure. B.P. 172° C./0.5 mm. Hg.

EXAMPLE 2

As in Example 1, diethyl N-ethyl-N-(6-methyl-2-pyridyl)aminomethylenemalonate (112 g.) and polyphosphoric acid (95 g.) are reacted to give 1-ethyl-7-methyl-4-oxo-1,8-naphthyridine-3-carboxylic acid (45.5 g.) as crystals melting at 227 to 228° C. Besides, 6-methyl-2-ethylaminopyridine (15 g.) is recovered.

The starting compound of this Example, i.e. diethyl N-ethyl-N-(6-methyl-2 - pyridyl)aminomethylenemalonate, is produced by heating a mixture of 6-methyl-2-ethylaminopyridine (72 g.) and diethyl ethoxymethylenemalonate (115 g.) at 100 to 110° C. for 8 hours while distilling out the by-produced alcohol and subjecting the reaction mixture to distillation under reduced pressure. B.P. 180° C./0.5 mm. Hg.

EXAMPLE 3

As in Example 1, diethyl N-n-propyl-N-(6-methyl-2-pyridyl)aminomethylenemalonate (114 g.) and polyphosphoric acid (100 g.) are reacted to give 1-n-propyl-7-methyl-4-oxo-1,8-naphthyridine-3-carboxylic acid (44 g.) as crystals melting at 208 to 209° C. Beside, there is recovered 6-methyl-2-n-propylaminopyridine (16 g.).

The starting compound of this Example, i.e. diethyl N-n-propyl-N-(6-methyl - 2 - pyridyl)aminomethylenemalonate, is produced by heating a mixture of 6-methyl-2-n-propylaminopyridine (90 g.) and diethyl ethoxymethylenemalonate (130 g.) at 100 to 110° C. for 8 hours while distilling out the by-produced alcohol and subjecting the reaction mixture to distillation under reduced pressure. B.P. 187° C./0.5 mm. Hg.

EXAMPLE 4

As in Example 1, diethyl N-n-butyl-N-(6-methyl-2-pyridyl)aminomethylenemalonate (92 g.) and polyphosphoric acid (80 g.) are reacted to give 1-n-butyl-7-methyl-4-oxo - 1,8 - naphthyridine-3-carboxylic acid (35 g.) as crystals melting at 219 to 220° C. Besides, 6-methyl-2-n-butylaminopyridine (11 g.) is recovered.

The starting compound of this Example, i.e. diethyl N-n-butyl-N-(6-methyl-2 - pyridyl)aminomethylenemalonate, is produced by heating a mixture of 6-methyl-2-n-butylaminopyridine and diethyl ethoxymethylenemalonate at 100 to 110° C. for 10 hours while distilling out the by-produced alcohol and subjecting the reaction mixture to distillation under reduced pressure.

EXAMPLE 5

As in Example 1, diethyl N-n-pentyl-N-(6-methyl-2-pyridyl)aminomethylenemalonate (136 g.) and polyphosphoric acid (110 g.) are reacted to give 1-n-pentyl-7-methyl-4-oxo-1,8-naphthyridine-3-carboxylic acid (53 g.) as crystals melting at 170 to 171° C. Besides, 6-methyl-2-n-pentylaminopyridine (15 g.) is recovered.

The starting compound of this Example, i.e. diethyl N-n-pentyl-N-(6 - methyl - 2 - pyridyl)aminomethylenemalonate, is produced by heating a mixture of 6-methyl-2-n-pentylaminopyridine and diethyl ethoxymethylenemalonate at 100 to 110° C. for 10 hours while distilling out the by-produced alcohol and subjecting the reaction mixture to distillation under reduced pressure.

EXAMPLE 6

As in Example 1, diethyl N-n-hexyl-N-(6-methyl-2-pyridyl)aminomethylenemalonate (120 g.) and polyphosphoric acid (104 g.) are reacted to give 1-n-hexyl-7-methyl-4-oxo-1,8-naphthyridine-3 - carboxylic acid (36.5 g.) as crystals melting at 145° to 146° C. Besides, 6-methyl-2-n-hexylaminopyridine (17 g.) is recovered.

The starting compound of this Example, i.e. diethyl N-n-hexyl-N-(6-methyl - 2 - pyridyl)aminomethylenemalonate, is produced by heating a mixture of 6-methyl-2-n-hexylaminopyridine and diethyl ethoxymethylenemalonate at 100 to 110° C. for 10 hours while distilling out the by-produced alcohol and subjecting the reaction mixture to distillation under reduced pressure.

EXAMPLE 7

As in Example 1, diethyl N-n-decyl-N-(6-methyl-2-pyridyl)aminomethylenemalonate (132 g.) and polyphosphoric acid (108 g.) are reacted to give 1-n-decyl-7-methyl-4-oxo-1,8-naphthyridine - 3 - carboxylic acid (32.5 g.) at 128 to 129° C. Besides, 6-methyl-2-n-decylaminopyridine (13 g.) is recovered.

The starting compound of this Example, i.e. diethyl N-n-decyl-N-(6 - methyl - 2 - pyridyl)aminomethylenemalonate, is produced by heating a mixture of 6-methyl-2 - n - decylaminopyridine (99 g.) and diethyl ethoxymethylenemalonate (86 g.) at 100 to 110° C. for 12 hours while distilling out the by-produced alcohol and subjecting the reaction mixture to distillation under reduced pressure.

EXAMPLE 8

As in Example 1, diethyl N-methyl - N - (6 - ethyl-2-pyridyl)-aminomethylenemalonate (97 g.) and polyphosphoric acid (79 g.) are reacted as in Example 1 to give 1-methyl-7-ethyl-4-oxo-1,8-naphthyridine - 3 - carboxylic acid (35 g.) melting at 242 to 243° C. Besides, 6-ethyl-2-methylaminopyridine (12 g.) is recovered.

The starting compound of this Example, i.e. diethyl N-methyl-N-(6-ethyl-2-pyridyl)aminomethylenemalonate, is produced by heating a mixture of 6-ethyl-2-methylaminopyridine and diethyl ethoxymethylenemalonate at 100 to 110° C. for 10 hours while distilling out the by-produced alcohol and subjecting the reaction mixture to distillation under reduced pressure.

EXAMPLE 9

As in Example 1, diethyl N-ethyl - N - (6 - ethyl - 2-pyridyl)-aminomethylenemalonate (98 g.) and polyphosphoric acid (83 g.) are reacted to give 1,7-diethyl-4-oxo-1,8-naphthyridine-3-caboxylic acid (35.5 g.) melting at 173 to 174° C. Besides, 6-ethyl-2-ethylaminopyridine (13 g.) is recovered.

The starting compound of this Example, i.e. diethyl N-ethyl-N-(6-ethyl-2 - pyridyl)aminomethylenemalonate, is produced by heating a mixture of 6-ethyl-2-ethylaminopyridine (75 g.) and diethyl ethoxymethylenemalonate (108 g.) at 100 to 110° C. for 8 hours while distilling out the by-produced alcohol and subjecting the reaction mixture to distillation under reduced pressure. B.P. 189° C./ 0.5 mm. Hg.

What is claimed is:

1. A process for preparing 1-alkyl-1,8-naphthyridine compounds which comprises treating a compound of the formula:

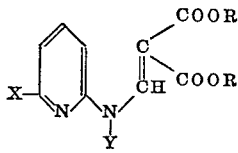

wherein X is an alkyl group having 1 to 3 carbon atoms, Y is an alkyl group having 1 to 10 carbon atoms and R is a lower alkyl group with polyphosphoric acid to give a compound of the formula:

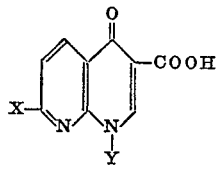

wherein X and Y are each as defined above.

2. The process according to claim 1, wherein polyphosphoric acid is the one being 4 in the average degree of condensation.

3. The process according to claim 1, wherein the treatment is carried out while heating at a temperature from from 160 to 250° C.

4. The process according to claim 3, wherein the treatment is carried out for 5 to 20 minutes.

5. The process according to claim 1, wherein the weight ratio of polyphosphoric acid and the starting compound is 0.5-2:1.

6. The process according to claim 1, wherein the starting compound is diethyl N-methyl - N - (6 - methyl - 2-pyridyl)-aminomethylenemalonate.

7. The process according to claim 1, wherein the starting compound is diethyl N-ethyl-N-(6-methyl-2-pyridyl)-aminomethylenemalonate.

8. The process according to claim 1, wherein the starting compound is diethyl N-n-propyl - N - (6 - methyl-2-pyridyl)-aminomethylenemalonate.

9. The process according to claim 1, wherein the starting compound is diethyl N-n-butyl-N-(6-methyl-2-pyridyl)-aminomethylenemalonate.

10. The process according to claim 1, wherein the starting compound is diethyl N-n-pentyl-N-(6-methyl-2-pyridyl)-aminomethylenemalonate.

11. The process according to claim 1, wherein the starting compound is diethyl N-n-hexyl-N-(6-methyl-2-pyridyl)-aminomethylenemalonate.

12. The process according to claim 1, wherein the starting compound is diethyl N-n-decyl-N-(6-methyl-2-pyridyl)-aminomethylenemalonate.

13. The process according to claim 1, wherein the starting compound is diethyl N-methyl-N-(6-ethyl-2-pyridyl)-aminomethylenemalonate.

14. The process according to claim 1, wherein the starting compound is diethyl N-ethyl-N-(6-ethyl-2-pyridyl)-aminomethylenemalonate.

15. The process according to claim 1, wherein the starting compound is prepared by reacting a 2-alkyl-aminopyridine compound of the formula:

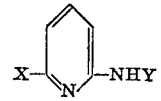

wherein X and Y are each as defined above with an alkoxymethylenemalonic ester of the formula:

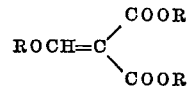

wherein R is as defined above.

References Cited

UNITED STATES PATENTS

| | | | |
|---|---|---|---|
| 3,149,104 | 9/1964 | Lesher et al. | 260—295.5 B |
| 3,567,716 | 3/1971 | Nishigaki et al. | 260—295.5 B |
| 3,590,036 | 6/1971 | Lesher et al. | 260—296 N |

OTHER REFERENCES

Lappin "J. Am. Chem. Soc.," vol. 70, pp. 3348–3350 (1948).

JOHN D. RANDOLPH, Primary Examiner

R. T. BOND, Assistant Examiner

U.S. Cl.X.R.

260—296 N, 295 R